Dec. 22, 1964  J. B. McFERRAN  3,162,775
SCANNING DEVICE EMPLOYING CRYOTRON BRIDGES CONNECTED
IN FREE-MATRIX FOR MEASURING MAGNITUDES
OF SELECTED INPUT SIGNALS
Filed May 31, 1962  3 Sheets-Sheet 1
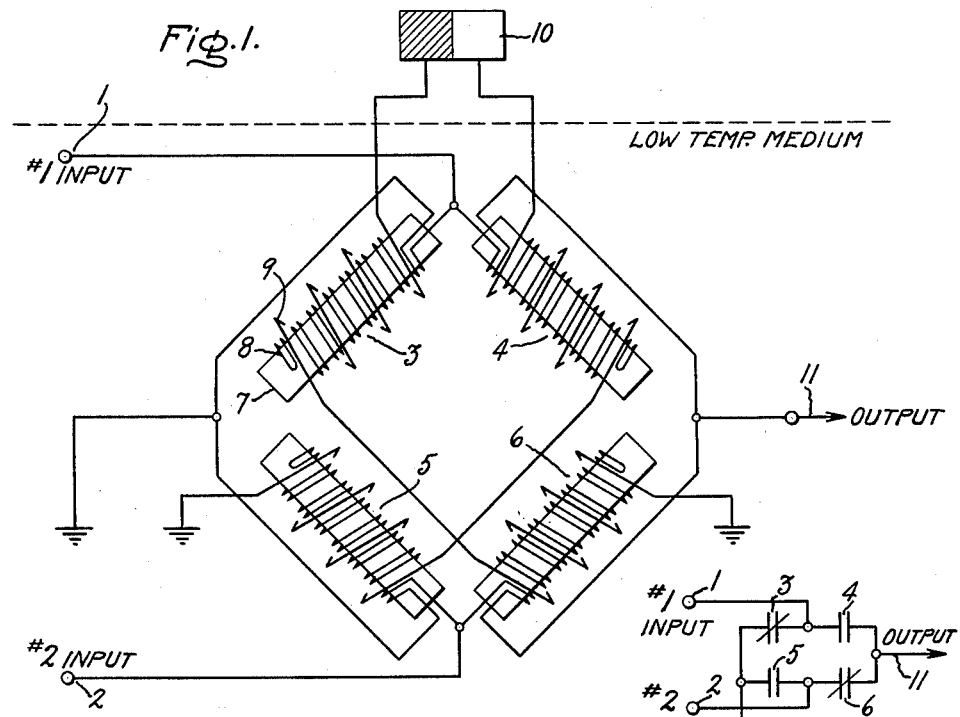
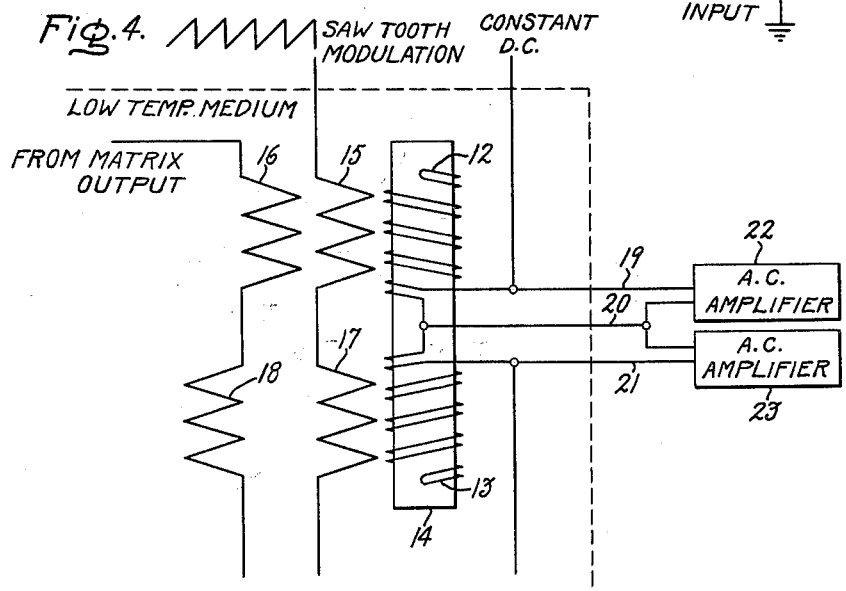
Inventor:
James B. McFerran,
by Paul A. Frank
His Attorney.

Dec. 22, 1964    J. B. McFERRAN    3,162,775
SCANNING DEVICE EMPLOYING CRYOTRON BRIDGES CONNECTED
IN FREE-MATRIX FOR MEASURING MAGNITUDES
OF SELECTED INPUT SIGNALS
Filed May 31, 1962    3 Sheets-Sheet 3

Inventor:
James B. McFerran,
by Paul A. Frank
His Attorney.

United States Patent Office 3,162,775
Patented Dec. 22, 1964

3,162,775
SCANNING DEVICE EMPLOYING CRYOTRON BRIDGES CONNECTED IN FREE-MATRIX FOR MEASURING MAGNITUDES OF SELECTED INPUT SIGNALS
James B. McFerran, Scotia, N.Y., assignor to General Electric Company, a corporation of New York
Filed May 31, 1962, Ser. No. 198,827
16 Claims. (Cl. 307—88.5)

My invention relates to a cryogenic scanning switch, and in particular to a cryogenic scanning switch system utilizing cryotron devices and to the components used in assembling this system.

Certain materials when subjected to extremely low critical temperatures exhibit a property wherein their electrical resistance suddenly drops to zero. This phenomenon is known as superconductivity and occurs in materials such as tin, lead, tantalum and niobium. The application of a sufficiently strong magnetic field, commonly known as the critical field, will cause any superconductive material to become nonsuperconductive or resistive. Another property of superconductive materials is that of magnetic flux exclusion whereby a superconductor tends to exclude all magnetic flux from its interior. A cryotron is a particular cryogenic device and comprises at least two superconductive elements, one of which is conventionally termed a gate element and the other a control element. The control element is continuously superconducting but the gate element is magnetically controlled by the field resulting from current in the control element and can be rendered either superconductive or resistive. This operation is analagous to the operation of a magnetic relay wherein an isolated pickup coil affects the continuity or impedance of another circuit. Thus the cryotron gate element may occupy either of two stable states. The gate and control elements may be of any form that provides magnetic coupling such as superconductive coils wound on a core or deposited superconductive thin film layers. Both elements are maintained below their critical temperatures so that they exhibit superconductive characteristics. The material forming the control element has a higher critical magnetic field strength than the material forming the gate element. As a result of this arrangement, a flow of electrical current through the control element can be employed to abruptly render the gate element resistive, thereby effecting a very fast switching action while maintaining the superconductivity of the control element. This switching action is particularly well suited to a scanning switch for high speed monitoring a large number of signals. The scanning switch application may be employed to monitor signals from sensors being used to test specific equipments such as thermocouples on turbines or vibration sensors on locomotives. It is the purpose of this disclosure to describe a cryogenic scanning switch which utilizes cryotrons and eliminates the costly and conventional need for employing a relay, transistor flip-flop circuit, or like device for each signal being monitored.

Therefore, one of the principal objects of my invention is to develop a new and improved cryogenic scanning switch utilizing cryotrons for high speed scanning a large number of signals.

Another object of this invention is to provide a number of cryogenic components fabricated from cryotrons for performing particular functions such as extracting magnitude information or transmitting only one of several of a number of input signals.

In its broadest aspect, my invention consists of providing a cryogenic scanning switch which utilizes a multiple selection of input signals to produce the scanning function. The scanning switch comprises a matrix of interconnected cryotrons with the scanned signals being connected as inputs to a number of the cryotron gate elements. Means are provided for alternate excitation of the cryotron control elements to render their magnetically coupled gate elements superconductive or nonsuperconductive as desired. The particular signal selected as an output at any moment is determined by the particular logic of gate elements which are rendered nonsuperconductive. Another cryotron circuit is employed as a detector to provide a means for determining the magnitude of the selected signal.

The features which I desire to protect herein are pointed out with particularity in the appended claims. The invention itself, together with further objects and advantages thereof, may best be understood by reference to the following description when considered in connection with the accompanying drawings wherein like parts of each of the figures are identified by the same reference character and wherein:

FIGURE 1 is a schematic diagram of a cryotron binary selector circuit, constructed in accordance with my invention;

FIGURE 2 illustrates a functional open and closed switch representation of FIGURE 1;

FIGURE 4 is a schematic diagram of a cryotron detector circuit constructed in accordance with my invention.

Figure 3:
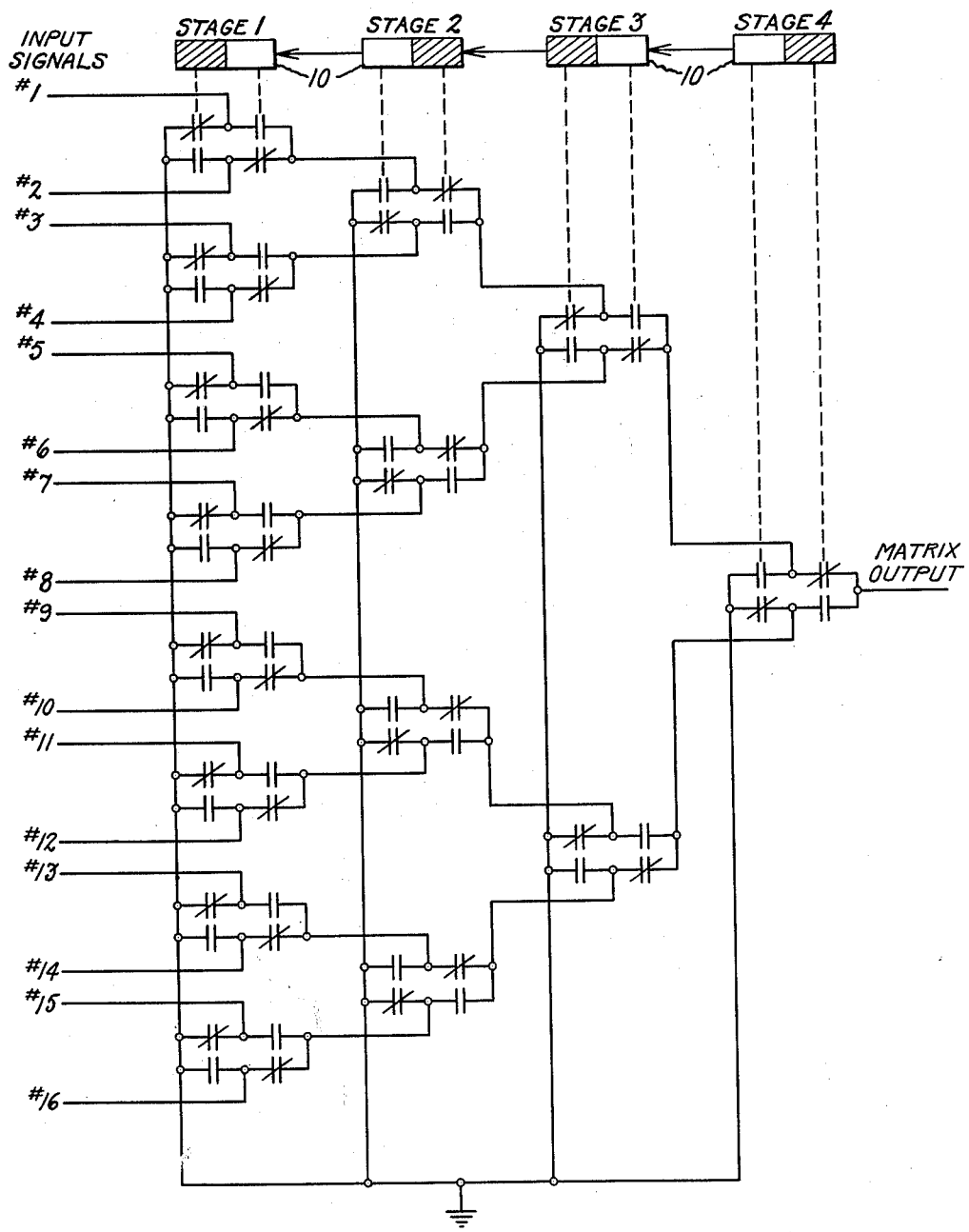
FIGURE 3 illustrates a functional representation of a matrix of interconnected cryotron binary selector circuits.

Referring particularly to the circuit illustrated in FIGURE 1, there is shown a cryotron binary selector circuit adapted to accept signals from two separate input sources and alternately transmit one of them to an output terminal and connect the other to a common reference point such as ground. Two input signals are thereby reduced to a single output signal. The two input signals are obtained from input sources designated by numerals 1 and 2. The binary selector circuit comprises four cryotrons each designated as a whole by numerals 3, 4, 5 and 6, and being located in a cryogenic or low temperature medium whereby the elements of the cryotrons are rendered superconductive. The particular cryotrons illustrated by example and not by way of limitation, are wire-wound and may comprise a cylindrical core 7 constructed either of superconducting or nonsuperconducting material, on which is wound a gate element 8 in bifilar form and over which is wound a control element 9. The cryotrons are preferably wound with an equal number of turns for each gate element and an equal number for each control element. Gate element 8 may be constructed of tin or tantalum, and control element 9 of lead or niobium respectively. The main purpose of the core 7 is to provide a rigid form for attachment of the gate and control elements. By use of the flux exclusion property of superconductors, a core of superconducting material such as niobium practically eliminates inductance in the control circuit and thus gives fast response to the cryotron while still permitting the necessary magnetic field to be developed in the gate elements. The electrical properties are additionally improved by the increased length of gate circuit relative to lead lengths, thereby obtaining higher levels of gate resistance when the gate element is nonsuperconductive. The configuration of the cryotrons may be such as to occupy separate cores as illustrated, a pair of cores, or a common core, as dictated by other considerations such as geometry or logic. Although a binary counter composed of cryogenic elements may be employed, the preferred embodiment utilizes a conventional bistable counter element 10 located outside the low temperature medium, thereby providing much faster response because of external resistance which may be used. Cryotrons 3, 4, 5, 6 are connected in bridge form, control elements 9 in opposing legs 3, 6, and 4, 5 being connected respectively in series with one of the nonconcurrent or alternate outputs of binary counter element 10. Input signals 1 and 2 are coupled to junctions that connect one end of the gate elements of cryotrons 3, 4 and 5, 6, respectively. Output terminal 11 is connected to the junction of the other end of the gate elements of cryotrons 4 and 6. The binary selector circuit functions in the following manner: Input signals 1 and 2 are constantly available at their separate input sources. Bistable counter element 10 supplies an alternate electrical output signal to the control elements 9 of the four cryotrons. Thus at one time, control elements of cryotrons 4 and 5 are energized as indicated by the noncrosshatched portion of bistable element 10, the gate elements of the respective cryotrons being rendered nonsuperconductive or resistive, whereas, the nonenergized control elements of cryotrons 3 and 6 maintain their associated gate elements superconductive. Therefore, in the time interval indicated by the logic in FIGURE 1, input signal 1 is provided with a zero resistance path to ground through the gate element of cryotron 3, whereas, input signal 2 is provided with a zero resistance path to output terminal 11 through the gate element of cryotron 6. As indicated in FIGURE 2, the cryotrons may be represented as open and closed switch contacts, the open contacts representing the resistive state and the closed contacts representing the superconductive state of gate elements of the respective cryotrons. Therefore, with the bistable counter element providing an output as illustrated in FIGURE 1, input signal 1 is grounded and input signal 2 is switched to output 11. In the next time interval, an electrical output will exist only from the crosshatched portion of counter element 10, thereby effecting nonsuperconductivity of the gate elements of cryotrons 3 and 6, and thereby grounding input signal 2 and transmitting input signal 1 to output 11. Thus, at any instant of time only one of input signals 1 or 2 is present at output 11.

By interconnecting a plurality of the cryotron binary selector circuits illustrated in FIGURES 1 and 2 in what may be designated as a branch or tree type of logic, the matrix shown in FIGURE 3 is capable of scanning or accepting a large number of input signals while providing a single selective output signal. The tree matrix requires several successive logic stages or groups of signal selection, the number of stages being determined as the power to which the number two must be raised to at least equal the number of scanned electrical input signals. Thus, for 16 input signals, four logic stages are required, while for 1000 input signals, ten stages are necessary. Each logic stage requires a predetermined number of cryotron binary selector circuits and a separate bistable counter element with its alternate electrical outputs exciting all of the selector circuits within that stage. As depicted in FIGURE 3, during a particular interval of time, one-half of the control elements in each of four stages are energized by particular outputs of four cascaded bistable counter elements to channel one selected input signal through the matrix to a sole output point, the illustrated example showing input 6 being so channeled. In another interval of time, the cryotrons will be switched according to the counter logic and a new input signal will appear at the output of the matrix. Location of the binary counter external to the low temperature medium requires that in the case of 16 input signals, eight separate control leads be brought into the low temperature medium, 20 separate leads would control 1000 input signals, while only 40 control leads would be needed for one million input signals. Since the control current is generally much greater than the gate current, this minimizing of control leads with increased number of electrical input signals offers a distinct thermal advantage over other methods of control, offering one solution to the conservation of helium within the cold temperature medium. Construction of the matrix may be accomplished by means of many gate windings closely spaced along common cores with either a single or minimum number of control windings wound over the entire core. Space for a 1000 input signal matrix occupies a volume approximately three-quarters of an inch square by eight inches long. The individual binary selector circuits are interconnected in a manner wherein the output of a binary selector circuit in stage 1 becomes an input signal to a binary selector circuit in stage 2 and this interconnection continues successively through the stages for all of the binary selector circuits until only one circuit remains in the last stage. Thus, the total number of cryotrons within a matrix is $4(N-1)$ wherein N represents the number of scanned input signals, and the number of cryotrons within any particular stage is $4(2^{A-1})$ wherein exponent A represents the particular stage as counted from the output end.

FIGURE 4 illustrates a schematic diagram of a cryotron detector circuit. The primary purpose of the detector is to provide a superconducting measurement of an input signal, and to transit this information to a point external to the lower temperature medium without interrupting the super-conducting circuit. The superconducting input is of particular advantage in that it provides a compatible method of transmission of all of the output current from the matrix, thereby eliminating the need for calibrated gate resistance values through the matrix. The circuit of the cryotron detector consists of two cryotron units, each unit comprising a superconductive gate element 12 or 13, wound in bifilar fashion on a common superconducting core 14, although separate cores can be used, and associated pairs of control elements 15, 16 or 17, 18. The control elements are comprised of windings connected in two separate control circuits, each circuit containing in series one winding from the two units. The windings are polarized to be magnetically aiding in one unit and opposing in the other unit, depending upon the polarity of the signal from the matrix output. Furthermore, the series windings in each circuit are of equal turns. The gate elements are connected in series, supplied from a source of constant direct current. Three potential leads 19, 20, 21, connected to ends of the gate windings, are brought out to conventional alternating current amplifiers 22, 23, located external to the low temperature medium. A repetitive saw-tooth modulation current is supplied externally to one of the control circuits 15, 17, and an output signal from the matrix circuit is connected to the other control circuit 16, 18. Because of their opposing connections and balanced windings, no net induced e.m.f. appears in either control circuit as a result of current in the opposite control circuit. As the saw-tooth modulating current increases in control elements 15, 17, a value is reached where gate elements 12, 13 become resistive, thereby developing corresponding voltages in time across the two gate elements as inputs to alternating current amplifiers 22, 23. The control current from the matrix advances the point in time at which the saw-tooth wave effects gate transition from superconductivity to non-superconductivity in the particular unit where the two control fields are aiding. In the other unit where the control fields are in opposition, gate transition is retarded by the control current from the matrix. The net result is to develop a time interval between the two transition states at which the gates become resistive. The length of this time interval is a linear measure of the magnitude of the matrix output current and this magnitude may be determined by suitable time interval measuring equipment. An advantage to using a pair of gate circuits is the cancellation of variations in the transition current resulting from changes in either the constant direct current gate current or temperature of the medium. Where environmental factors vary, the transition points of both units shift together and minimum variation appears in the measured interval between units.

Figure 5:
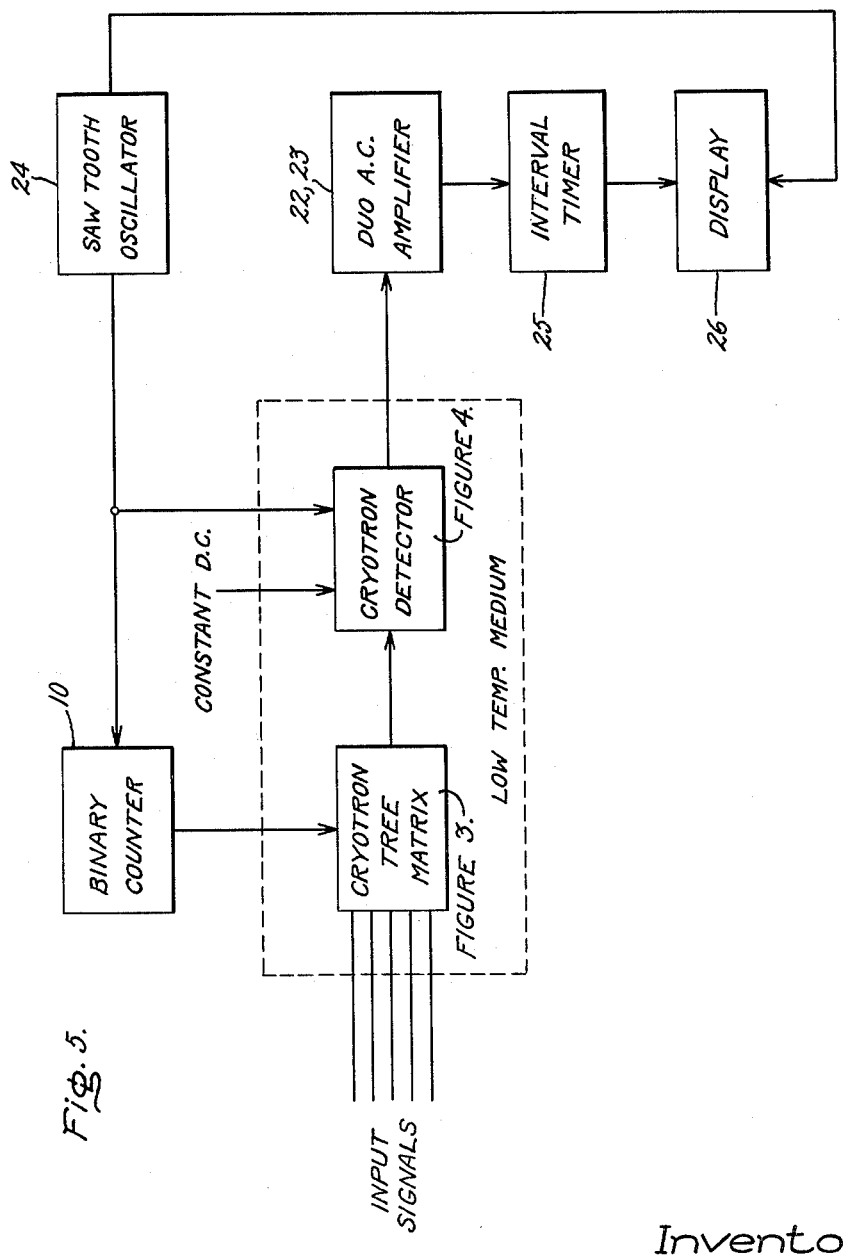
FIGURE 5 is a block diagram of a cryogenic scanning switch system utilizing cryotron components illustrated in FIGURES 3 and 4.

A cryotron scanning switch system is illustrated in FIGURE 5, adapted for high speed scanning a predetermined number of electrical input signals for detecting the presence of an unusual condition in any one of the scanned signals and for analyzing selected signals. The electrical input signals are brought directly into a low temperature medium and connected to appropriate gate elements in the first logic stage of a cryotron tree matrix. It should be apparent that the number of electrical input signals that may be scanned is determined by the number of stages of signal selection available within the matrix. Control leads are also brought into the low temperature medium from an externally located binary counter 10 and are connected to appropriate control elements in the various stages of the tree matrix. The output of the matrix is connected to a control input circuit of a cryotron detector. A constant direct current gate current and a saw-tooth modulating current for the other control circuit are brought into the detector from outside the low temperature medium. A conventional saw-tooth oscillator 24 provides the modulating current for the detector control circuit and also provides triggering and synchronizing signals for binary counter 10 and the time interval measuring equipment. Potential leads from the detector circuit are brought out to alternating current amplifiers 22, 23, which are connected to a suitable interval timer 25, thereby providing a linear measure of the matrix output current. The output of interval timer 25 may be recorded on a display device 26 in analog or digital output form. This display may take the form of an oscillographic array of all scanned signals with means for analyzing particular signals including individual measurements. A scanning switch embodying my invention comprising a matrix of ten logic stages is capable of scanning 1000 input signals at a repetitive scanning period of 0.2 second.

The small size of cryotron devices, simplicity of their construction, and high reliability, overcomes the disadvantages of the low temperature medium required for the hitherto described cryotron scanning switch. The cyrotrons may be packaged at a density of at least one million cryotrons per cubic foot. The cryotron selector switch and the cryotron detector described herein may have wide application in digital computers designed for low temperature operation. The low temperature medium would be appropriate to the computer requirements of a system of space navigation.

Having described a new cryotron scanning switch and components therefor, for effecting high speed scanning of many signals in accordance with my invention, it is believed obvious that other modifications and variations of the invention are possible in light of the above teachings. For example, deposited superconductive thin film layers may be utilized instead of wire-wound cryotrons, thereby providing even faster response. Also, the invention is not limited to the binary mode of control, but may employ a multiplicity of signals to logically determine the mode of operation. It is, therefore, to be understood that changes may be made in the particular embodiment of my invention described which are within the full intended scope of the invention as defined by the following claims.

What I claim as new and desire to secure by Letters Patent of the United States is:

1. A cryogenic switching circuit comprising,
   means for supplying intermittent electrical signals,
   a plurality of cryotrons, each cryotron comprising a gate element and associated control element, said plurality of cryotrons arranged in at least one bridge circuit comprised of four cryotrons each,
   selected ones of said control elements being simultaneously responsive to one of the intermittent electrical signals,
   means for supplying the gate elements with a plurality of electrical input signals,
   and means for switching selected ones of the input signals to an output circuit at a predetermined time.

2. A cryogenic signal selector circuit comprising,
   a plurality of cryotrons, each cryotron including a superconductive control element and associated gate element, said plurality of cryotrons arranged in at least one bridge circuit comprised of four cryotrons each,
   means for supplying two nonconcurrent control element energizing signals, each said nonconcurrent signal being coupled respectively to one-half of said control elements to effect their associated gate elements nonsuperconductive during the time said signal exists,
   means for providing a plurality of electrical input signals to the gate elements,
   and means connected to one-half of said gate elements for transmitting one-half of the input signals to an output circuit at a particular time as determined by the gate elements remaining superconductive.

3. In a cryotron binary selector circuit adapted to accept signals from two separate input sources and alternately transmit one of the input signals comprising,
   a bistable counter element supplying alternate electrical output signals,
   four cryotrons arranged in bridge form wherein a first and second cryotron comprise one pair of opposing legs of the bridge, and a third and fourth cryotron comprise the other pair, each of said cryotrons including a superconductive gate element and a superconductive control element, each said control element switching its associated gate element to its resistive state when said control element is energized by an output signal of the counter element,
   a first output of said counter element connected in a series circuit with the superconductive control elements of the first and second cryotrons,
   a second output of said counter element connected in a series circuit with the superconductive control elements of the third and fourth cryotrons,
   a first electrical input source adapted to provide a first input signal, said first source coupled to a common junction that connects one end of the superconductive gate elements of the first and third cryotrons,
   a second electrical input source adapted to provide a second input signal, said second source coupled to a common junction that connects one end of the superconductive gate elements of the second and fourth cryotrons,
   and an output terminal connected to a common junction that connects the other end of the superconductive gate elements of the second and third cryotrons, only one of the input signals being selected at said output terminal at a time as determined by the particular two gate elements that remain superconductive when an output signal of the counter element energizes two of the control elements.

4. The combination set forth in claim 3 wherein the other end of the superconductive gate elements of the first and fourth cryotrons and one end of the superconductive control elements of the second and fourth cryotrons are connected to a common reference point.

5. The combination set forth in claim 3 wherein said cryotrons are located in a low temperature medium and said counter element is located outside said medium.

6. A cryogenic switching circuit matrix comprising,
   means for providing a plurality of alternate electrical output signals,
   a plurality of cryotrons arranged in groups, each group being responsive to a particular alternate electrical output signal, each group comprising at least one bridge circuit of four cryotrons each, means for interconnecting selected bridge circuits of cryotrons between adjacent groups thereof,
   and series connecting means for selectively permitting a number of cryotrons in each group to respond to a first alternate electrical output signal at a first time while also permitting the remaining cryotrons in each group to respond to the corresponding alternate electrical output signal at a second time.

7. A cryogenic switching circuit comprising,
a plurality of cryotrons arranged in successive stages, each cryotron comprising a gate element and associated control element, each stage comprising at least one bridge circuit of four cryotrons each,
a plurality of means for providing nonconcurrent electrical signals,
a number of control elements in each stage of cryotrons being responsive respectively to first of the nonconcurrent electrical signals, the remaining control elements being responsive respectively to second of the other nonconcurrent electrical signals,
means for supplying the gate elements of the first stage of cryotrons with a plurality of electrical input signals,
and means for excluding all but one of the input signals from an output circuit coupled to the last stage of cryotrons.

8. A cryogenic selector circuit comprising,
means for providing a plurality of two nonconcurrent electrical output signals,
a plurality of cryotrons arranged in successive groups, each cryotron including a superconductive control element and associated gate element, each group comprising at least one bridge circuit of four cryotrons each,
each nonconcurrent electrical output signal being coupled respectively to one-half of the control elements of each group of cryotrons to effect their associated gate elements nonsuperconductive during the time said output exists,
means for providing a plurality of electrical input signals to the gate elements of the first group of cryotrons,
and means interconnecting the gate elements of successive groups of cryotrons for selecting only one of the input signals as a signal in an output circuit in the last group of cryotrons at a selected time.

9. In a cryogenic selector circuit adapted to accept signals from a plurality of input sources and to transmit only one of the signals to an input circuit at one time, comprising,
a plurality of bistable counter elements, each element supplying alternate electrical output signals,
a matrix comprising a plurality of cryotrons arranged in stages of successively decreasing numbers of cryotrons, each stage comprising $4(2^{A-1})$ cryotrons wherein exponent A represents the particular stage as counted from the output circuit, each of said cryotrons including a superconductive gate element and a superconductive control element for switching the gate element to its resistive state when said control element is energized by an output signal of a counter element,
the alternate electrical output signals of each counter element being connected respectively in a series circuit with one-half of the superconductive control elements of a particular stage of cryotrons,
a plurality of electrical input sources each adapted to provide separate input signals, said sources coupled to the superconductive gate elements of the stage comprising the largest number of cryotrons,
an output terminal connected to two of the superconductive gate elements of the stage comprising the smallest number of cryotrons,
and means interconnecting various of the superconductive gate elements to permit the selection of only one of the input signals at the output terminal at a time as determined by the particular gate elements that remain superconductive when the output signals of the counter elements energize particular control elements according to the control logic.

10. A cryogenic measuring circuit comprising,
two cryotrons, each cryotron comprising at least two superconductive control elements and one gate element,
means for supplying a repetitive modulation signal to a first control element of each cryotron,
means for supplying an input signal to a second control element of each cryotron to develop a time interval between the two transition states at which the gate elements become nonsuperconductive,
and an output circuit connected to a gate element of each cryotron for providing a measurement of the input signal as a function of the time interval between the two transition states at which the gate elements are rendered nonsuperconductive.

11. A cryotron circuit for detecting the magnitude of an input signal comprising,
two cryotrons, each cryotron comprising two superconductive control elements and one superconductive gate element,
a first control element of each cryotron connected in a series circuit with a saw-tooth modulation signal,
a second control element of each cryotron connected in a series circuit with an input signal to be measured, one of said second control elements connected in magnetic aiding relationship to its first control element, and the other second control element connected in magnetic opposing relationship to develop a time interval between the transition states of the gate elements,
and an output circuit connected to the gate element of each cryotron for providing a measurement of the magnitude of the input signal as a function of the time interval between transition states of the gate elements.

12. The combination set forth in claim 11 wherein said output circuit comprises,
a source of constant direct current connected in series with the two gate elements,
said gate element of each cryotron being rendered resistive at different times as determined by the respective magnitudes of magnetic fields produced by the input and saw-tooth modulation signals,
and two alternating current amplifiers, each amplifier connected across one of said gate elements and producing an output voltage pulse when the respective gate element becomes resistive, the time interval between the gate elements becoming resistive being a linear measure of the magnitude of the input signal.

13. The combination set forth in claim 12 wherein said cryotrons are located in a low temperature medium and said alternating current amplifiers are located outside said medium.

14. A cryogenic system for monitoring a number of electrical signals comprising,
means for providing a first plurality of alternate electrical output signals,
a plurality of cryotrons arranged in groups, each group of cryotrons comprising at least one bridge circuit of four cryotrons each, each group of cryotrons being responsive to a particular one of said alternate electrical output signals,
means for supplying a first group of said cryotrons with a second plurality of electrical signals to be monitored,
means for selecting only one of said monitored electrical signals at the output of a last group of said cryotrons,
and means for measuring the magnitude of the selected of said monitored electrical signals.

15. In a cryogenic system for high speed scanning of many electrical signals comprising,
an input source of electrical signals being scanned, a first plurality of cryotrons arranged in successive stages, each cryotron comprising a gate element and control element, each gate element of the cryotrons comprising the first stage connected to one of said electrical signals, means for supplying a plurality of alternate energizing signals in a logic sequence, one-half of the control elements in each stage of cryotrons being responsive respectively to a first of the alternate energizing signals, the remaining control elements in each stage being responsive respectively to a second of said alternate energizing signals, a first output circuit connected to the last stage of cryotrons for selecting only one electrical signal from said input source at a time as determined by the logic sequence of the energizing signals, a second plurality of cryotrons, each cryotron comprising a gate element and two control elements, one control element of each of said second plurality of cryotrons connected in series with said first output circuit, the remaining control elements of each of said second plurality of cryotrons connected in a series circuit with a saw-tooth modulation signal, the gate elements of each of said second plurality of cryotrons being series connected to a source of direct current in a second output circuit, and said second output circuit also including means to provide a measurement of the magnitude of the selected electrical signal as determined by the different times that each gate element of said second plurality of cryotrons becomes resistive in response to magnetic fields produced by the control elements of said second plurality of cryotrons.

16. The combination set forth in claim 15 wherein said first and second plurality of cryotrons and first output circuit are located in a low temperature medium and the other components are located outside said medium.

References Cited in the file of this patent

UNITED STATES PATENTS

| | | |
|---|---|---|
| 2,832,897 | Buck | Apr. 29, 1958 |
| 2,946,030 | Slade | July 19, 1960 |
| 2,965,887 | Yostpile | Dec. 20, 1960 |
| 3,023,325 | Brennemann | Feb. 27, 1962 |
| 3,060,323 | Nyberg | Oct. 23, 1962 |
| 3,091,702 | Slade | May 28, 1963 |